May 1, 1928. 1,667,893
H. O. HEM
WEIGHING SCALE
Filed Feb. 25, 1920 3 Sheets-Sheet 1
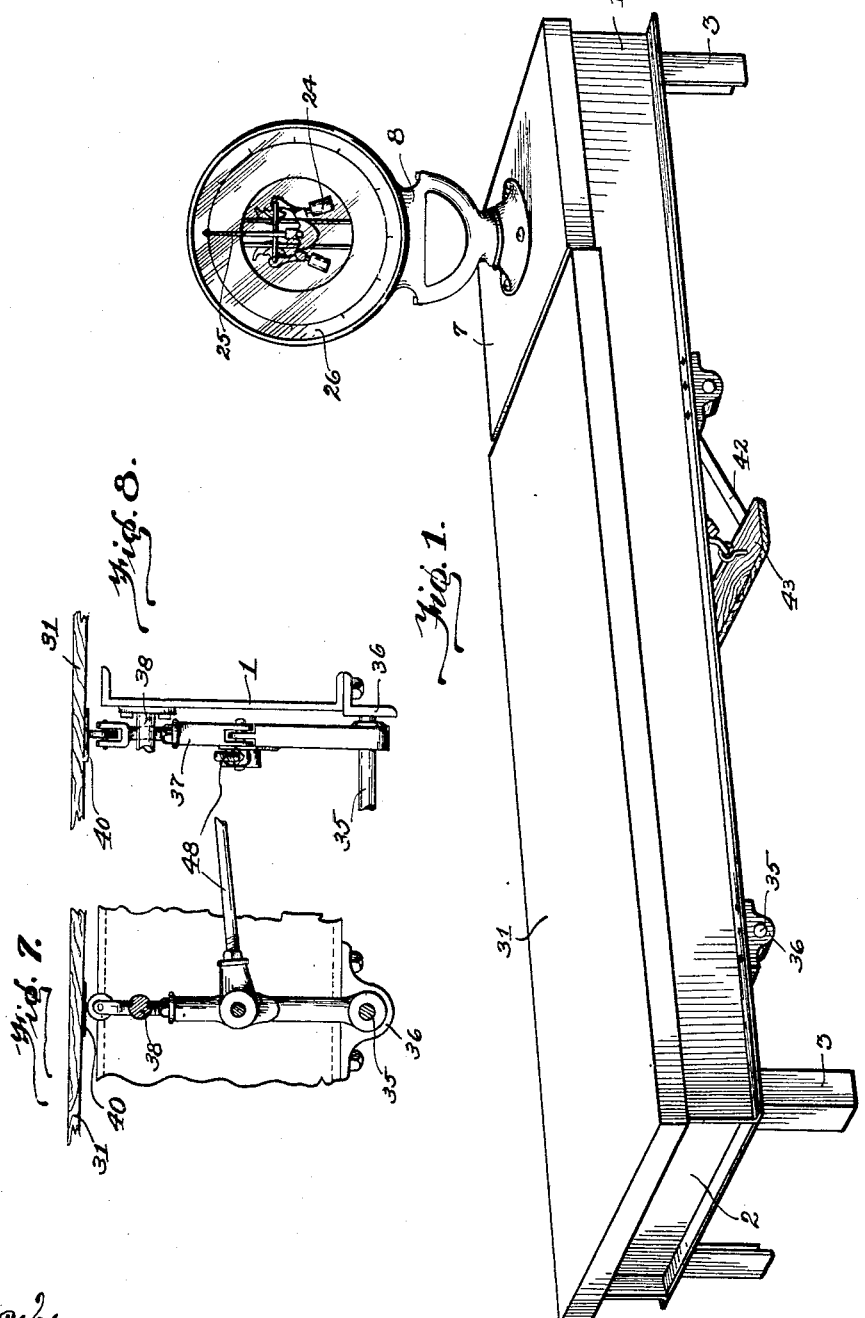

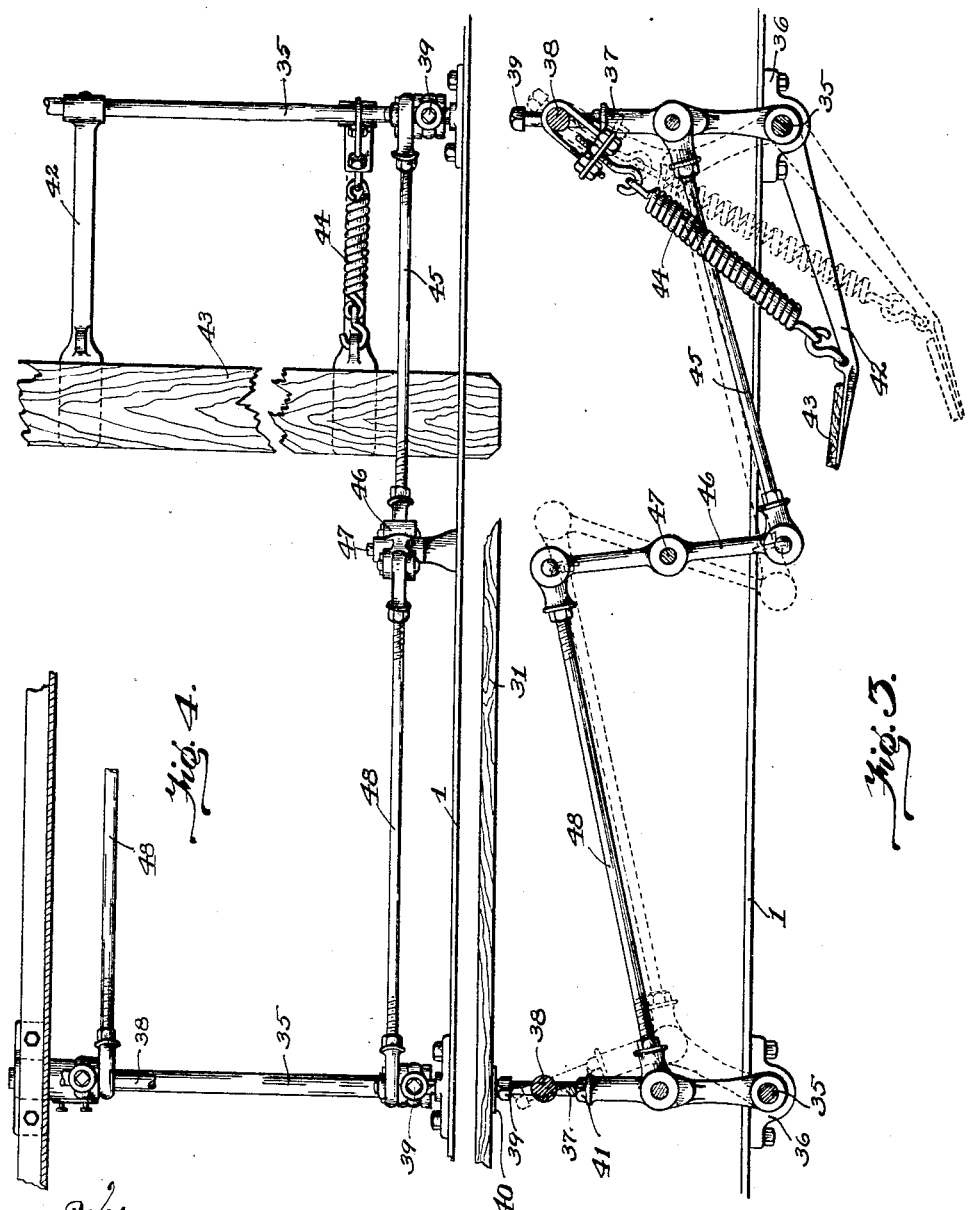

May 1, 1928.
H. O. HEM
WEIGHING SCALE
Filed Feb. 25, 1920
1,667,893
3 Sheets-Sheet 3
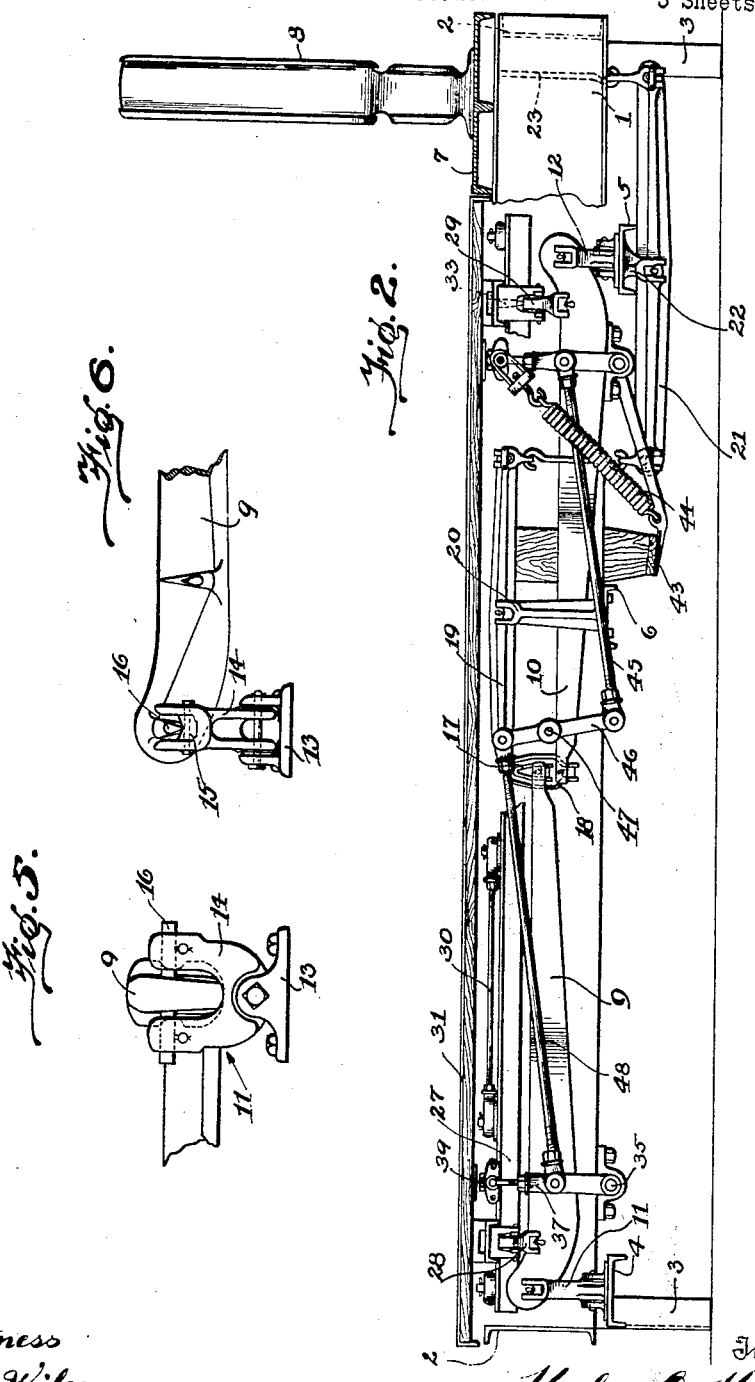
Witness
C. E. Wilcox
Inventor
Halvor O. Hem
By George R. Frye
Attorney Patented May 1, 1928.

1,667,893

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed February 25, 1920. Serial No. 361,253.

This invention relates to weighing scales, and particularly to scales which are so used that the platform is likely to be subjected to shocks, and one of its principal objects is to provide an automatic device for protecting the weighing mechanism from said shocks, thereby avoiding wear and battering of the bearings and other injuries to the weighing mechanism.

I have shown the invention in connection with a scale adapted for use in bundling sheet iron, and it is especially adapted for use in such a scale, but it is to be understood that the various features of the invention in its broad aspect are also adapted for employment in other scales and that I contemplate its use wherever applicable.

Sheet metal is usually cut into sheets from 2 to 3 ft. in width and from 8 to 10 ft. in length. In order to facilitate shipping and handling, sheets of uniform size and gage are packed in bundles bound with strap iron, the weight of each bundle being marked thereon. One of the specific objects of my invention is to provide a scale which can be used as a bench upon which such sheets may be bundled, the platform being supported during the bundling operation independently of the weighing mechanism of the scale and being adapted to be engaged with the weighing mechanism only when the weighing operation is to be performed.

Another object is the provision of means for automatically disengaging the platform after each weighing operation.

Still another object is to so arrange the platform lever mechanism that the indicator of the scale may be placed either at the end or at one side of the platform.

Other objects and advantages will be apparent from the following description, in which reference is had to the accompanying drawings illustrating a preferred embodiment of my invention and in which similar reference numerals designate similar parts throughout the several views.

In the drawings:

Figure 1 is a perspective view of a scale embodying my invention;

Figure 2 is a side elevation of the same with one of the side frame members partly broken away to show part of the weighing and platform lifting mechanism;

Figure 3 is a side elevation of part of the platform lifting mechanism, the cross members being shown in section;

Figure 4 is a plan view of the platform lifting mechanism, parts being broken away;

Figure 5 is an enlarged end view showing one of the main platform levers supported upon a pivoted fulcrum stand forming a feature of my invention;

Figure 6 is a side elevation of the same;

Figure 7 is an enlarged side elevation of a modified part of the platform lifting mechanism; and Figure 8 is an end elevation thereof.

The stationary supporting frame of the scale shown in the drawings is constructed of commercial stock and comprises channel side and end members 1 and 2 suitably secured together and supported upon angle metal legs 3. Spaced channel cross members 4, 5 and 6 are secured to the lower sides of the side members 1 and serve to support the fulcrum stands of the platform lever mechanism, while a metal deck 7 overlies one end of the frame and supports the upright housing 8.

The main platform levers 9 and 10 are substantially Y-shaped in plan, their fulcrum pivots being at their forked ends and the nose pivot of the lever 9 lying directly above the nose pivot of the lever 10. The fulcrum pivots of the levers 9 and 10 are supported upon pivoted fulcrum stands 11 and 12 secured to the cross members 4 and 5. The fulcrum stands 11 and 12 are identical in construction except that the stands 11 are somewhat taller than the stands 12. As is clearly shown in Figures 5 and 6, each fulcrum stand 11 consists of an apertured bracket 13 to which is pivoted a substantially U-shaped member 14 which carries self-aligning bearings 15 in its upstanding ends. The bolt by which the U-shaped number is pivoted to the bracket 13 passes through the bight portion of the U-shaped member. A knife edge pivot 16 extends through the end of each fork of the Y-shaped lever 9 and rests on the bearings 15.

The nose pivots of the levers 9 and 10 are connected by means of links 17 and 18 to a lever 19, here shown as an equal arm lever, which extends toward one end of the scale. The lever 19 is fulcrumed upon the stand 20 secured upon the cross member 6.

In order that the housing 8 may be placed at the end of the frame or at one side thereof without materially altering the arrangement of the levers, I prefer to connect the platform levers to the head mechanism of the scale through the connecting lever 19 and the lever 21, which may extend in any direction from the end of the lever 19. If the material which the scale is used to weigh is to pass over the scale from end to end, the head would, of course, be placed at the side. The fulcrum bracket 22 of the lever 21 would in such case be secured in position at the side of the frame. The fulcrum bracket 22 is in the present case shown as secured to the cross member 5. The lever 21 extends longitudinally of the scale to a point beneath the deck 7 and is connected to the load-offsetting mechanism, which is enclosed in the housing 8, by means of a steelyard 23. The housing 8 may be turned, as shown in Figure 2, to face the scale platform, or it may be turned obliquely, as shown in Figure 1.

The load-offsetting mechanism is of the automatic pendulum type, fully shown and described in the patent to Hapgood, No. 1,203,611, November 7, 1916, and as my invention does not reside in the automatic pendulum mechanism per se, I will describe it only in such detail as will suffice for a clear understanding of the scale. Oppositely-swinging pendulums 24 are supported in the upper portion of the housing 8, which is shaped substantially like the casing of a watch and has a crystal face to display the weighing and indicating mechanisms. The pendulums 24 are supported in the housing and so connected to the steelyard 23 that as the steelyard is pulled downwardly by a load on the scale the pendulums swing outwardly and upwardly until the load on the scale is counterbalanced. An indicator hand 25 is suitably connected to the pendulum mechanism and moves over a dial 26 to indicate the weight of the load offset.

A frame 27 is supported upon the load pivots of the platform levers 9 and 10 by means of brackets 28 and 29 similar, except in that they are inverted, to the U-shaped members 14. The frame 10 is held in position by means of substantially horizontal check links 30 which tie it to the stationary main frame of the scale. The frame 27 supports a platform 31 during weighing operations. Normally, however, the platform is held out of engagement with the frame 27 by means of the platform raising device or relieving gear described below. In order to prevent the platform from shifting horizontally relatively to the frame 27, pins 33 are secured to the platform 31 and project downwardly into openings in cross members of the frame 27.

The platform raising device includes a pair of toggles at each end of the scale, the lower ends of the toggles being fixed upon shafts 35, the ends of which are journaled in bearings 36 secured upon the lower sides of the stationary frame members 1. The upper toggle members 37 are slidable through diametral bores in rock shafts 38 which are rotatably mounted in the stationary frame of the scale, and are provided with crowned heads 39 to engage wear plates 40 on the lower side of the platform when the toggles are straightened. The upper toggle members are adjustable in length, comprising two parts threaded together and held against accidental turning by means of lock nuts 41. Fixed to the rear shaft 35 is a pair of arms 42 carrying a treadle 43 normally held in elevated position by means of a retractile spring 44, the ends of which are connected respectively to one of the arms 42 and the rock shaft 38. When the treadle 43 is depressed the forward toggles are buckled and the upper toggle members are drawn downwardly through the bores in the shaft 38 and the heads 39 are thus drawn out of engagement with the platform. Extending rearwardly from the junctions of the forward toggles is a pair of links 45, the said links having their rear ends partially connected to the lower ends of levers 46 fulcrumed upon pins 47 projecting from the frame members 1. Similar links 48 connect the upper ends of the levers 46 and the junctions of the rear toggles. It will be seen that the toggles are thus broken and straightened simultaneously.

The upper ends of the toggles may, if desired, be equipped with anti-friction rollers such as are shown in Figure 8. The toggles shown in this figure are in all other respects similar to those shown in Figure 3.

In using this scale for bundling sheet metal, strips of strap iron somewhat longer than the width of the iron to be bundled are laid across the scale platform. The iron sheets are then laid upon the strips, and the strips are bent over the edges of the sheets and hammered down by means of a sledge. Since the spring 44 holds the toggles straight at all times except when the treadle is depressed, the platform is supported upon the heads 39 during the time the scale is being loaded and the strap ends are being hammered down, and the pivots and bearings are not subjected to the wear and battering that would take place if the platform were at this time carried by the scale levers. When the weight of the bundle is to be taken the operator depresses the treadle 43 and thus lowers the platform 31 upon the frame 27, whereupon the weight is automatically registered upon the dial 26. As soon as the operator removes his foot from the treadle the spring 44 acts to straighten the toggles and the platform is automatically raised. Thus, all danger of inadvertent failure to raise the platform is obviated.

While it will be apparent that the illustrated embodiment of my invention is well calculated to adequately fulfill the objects primarily stated, it is to be understood that the invention is susceptible to variation, modification and change within the spirit and scope of the subjoined claims.

Having described my invention, I claim:

1. In a weighing scale, in combination, weighing mechanism, a commodity-receiver, toggles for lifting said commodity-receiver from said weighing mechanism, anti-friction rollers on said toggles for engaging said commodity-receiver and means for retaining said toggles in operative position independently of their engagement with said commodity-receiver.

2. In a weighing scale, in combination, a platform, platform lever mechanism, an extension lever and means connecting said extension lever to said platform lever mechanism at a point substantially equi-distant from an end and a side of the platform, said connecting means being such that the said extension lever may be extended from said end or said side.

3. In a weighing scale, in combination, a platform, a pair of levers supporting said platform and having their noses adjacent the center thereof, an extension lever connected to said noses and extending toward one end of said platform, and a second extension lever connected to the first said extension lever and adapted to extend from beneath said platform at the end or side thereof.

4. In a weighing scale, in combination, a base, platform levers connected thereto, a frame supported by said platform levers, a platform, spring operated means for normally yieldingly holding said platform off said frame, means operable in opposition to said spring operated means for placing said platform upon said frame, and means for guiding said platform into position.

HALVOR O. HEM.